Patented Apr. 6, 1954

2,674,621

UNITED STATES PATENT OFFICE 2,674,621

SYNTHESIS OF COMPOUNDS HAVING VITAMIN A ACTIVITY

William Oroshnik, Plainfield, N. J., assignor to Ortho Pharmaceutical Corporation, a corporation of New Jersey No Drawing. Application October 3, 1947, Serial No. 777,862

15 Claims. (Cl. 260—488)

This invention relates to compositions of matter and to methods for preparing the same. This invention particularly relates to compounds which are derivatives of α-ethynyl-β-ionol and to methods of preparing the said derivatives.

It is an object of this invention to prepare compounds to be used as intermediates in the preparation of compounds having vitamin A activity.

It is another object of this invention to prepare compounds having the same number of carbon atoms and the same configuration with respect to carbon atoms as vitamin A ethers or esters.

It is another object of this invention to prepare hydroxy compounds having the same number of carbon atoms and the same configuration with respect to carbon atoms as vitamin A ethers or esters.

It is still another object of this invention to prepare a hydroxy compound having the same number of carbon atoms and the same configuration with respect to carbon atoms as vitamin A or a vitamin A ether which has vitamin A activity and marked stability to oxidation.

It is another and further object of this invention to prepare compounds having the same number of carbon atoms and the same configuration with respect to carbon atoms as vitamin A esters or ethers and the same number of hydrogen atoms as vitamin A esters or ethers.

It is another object of this invention to prepare compounds having vitamin A activity.

Other objects of this invention will be apparent from the description following and from the appended claims.

In the "Journal of the American Chemical Society," volume 67, page 1627 (1945), the inventor disclosed that certain derivatives of α-ethynyl-β-ionol have value as intermediates in the preparation of synthetic compounds having vitamin A activity. This publication disclosed that a compound having the following formula:

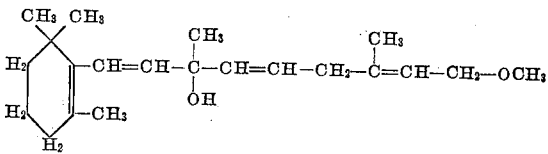

could be prepared by catalytic reduction of an acetylenic compound prepared by reacting α-ethynyl-β-ionol with a Grignard reagent and an ether of a 1,4 chlorohydrin of isoprene according to the following equation:

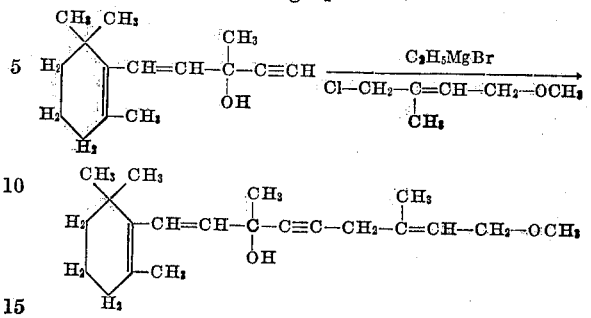

The acetylenic compound could not be distilled without dehydration because of impurities which were present. The reduction product of the acetylenic compound could be converted to a compound having vitamin A activity by a simultaneous rearrangement and dehydration.

As shown in the publication cited above, the inventor has discovered certain new derivatives of α-ethynyl-β-ionol and a method for their preparation. It has now been further discovered that the said derivatives of α-ethynyl-β-ionol may be prepared in excellent yields and that they may be prepared free from impurities and stable to distillation. It has also been discovered that esters of a 1,4 halohydrin of isoprene, as well as the corresponding ethers, may be used in the reaction with α-ethynyl-β-ionol and that thereby new and analogous derivatives having a terminal ester group may be obtained.

It has been further discovered that the said derivatives of α-ethynyl-β-ionol may be isomerized and dehydrated or dehydrated and isomerized to form additional derivatives which have vitamin A activity.

In the practice of this invention an acetylenic carbinol,

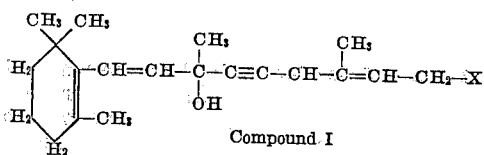

Compound I in which X is —OR or

and R is a hydrocarbon radical, may be prepared by either of two routes.

In the first and preferred route α-ethynyl-β- ionol is reacted with a reagent such as a metal alkyl in which the metal is a member of the first group, preferred reagents being CH₃Li and C₄H₉Li; or a metal alkyl in which the metal is a member of the second group such as zinc or magnesium. When zinc is the metal, the reagent may be a zinc dialkyl such as (CH₃)₂Zn or an alkyl zinc iodide such as CH₃ZnI; and when magnesium is the metal, the reagent may be dialkyl magnesium such as (C₂H₅)₂Mg or a Grignard reagent such as C₂H₅MgBr. The Grignard reagent is preferred.

The reagent may be considered as having the following general formula: $(R')_xMY$, in which R' is a hydrocarbon radical, such as methyl, ethyl, benzyl, and the like; $x$ is an integer not greater than two; M is a metal having a valence not greater than two, and Y is a halogen if $x$ is one and the valence of the metal is two; but Y is nonexistent if M is a metal having a valence of one or if M is a metal having a valence of two and $x$ is two.

α-Ethynyl-β-ionol may be prepared in a number of different ways and in particular by reacting β-ionone with calcium or lithium acetylide in an inert solvent as set forth in my U. S. Patent No. 2,425,201, filed September 11, 1945, and issued August 5, 1947; and in my copending application Serial No. 655,607, filed March 19, 1946, now U. S. Patent No. 2,472,310.

The product of this first reaction is represented by the formula:

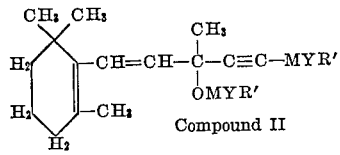

Compound II in which M, Y, and R' have the same significance as above; but in which Y and R' are nonexistent if M is a metal having a valence of one, R' is nonexistent if M is a metal having a valence of two and Y is a halogen, and Y is nonexistent if M is a metal having a valence of two and R' is a hydrocarbon radical. In the preferred embodiment MY is MgBr and R' is nonexistent or M is a metal having a valence of one and Y and R' are nonexistent. In the single preferred practice or embodiment MY is MgBr and R' is nonexistent. The preparation of this compound is described in my copending U. S. application Serial No. 657,912, filed March 28, 1946, now abandoned. Compound II is reacted with an ether or ester of a 1,4 halohydrin of isoprene represented by the formula

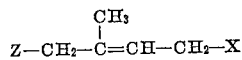

in which Z is a halogen, X is —OR or

and R is a hydrocarbon radical and in which, in the preferred form, X is —OCH₃. The preparation of this reagent is described in my copending U. S. applications Serial No. 633,873, filed December 8, 1945, now U. S. Patent No. 2,541,091, and Serial No. 633,874, filed December 8, 1945, now U. S. Patent No. 2,511,870.

The reaction of Compound II with an ether or ester of a 1,4 halohydrin of isoprene is preferably catalyzed by any compound capable of reacting with a Grignard reagent. Cuprous bromide, cuprous chloride, cuprous iodide, cuprous cyanide, cupric chloride, cobalt chloride, ferric chloride, and cupric bromide are satisfactory catalysts, but anhydrous cupric chloride is preferred. The product of this reaction, before hydrolysis, is present in solution and corresponds to the formula

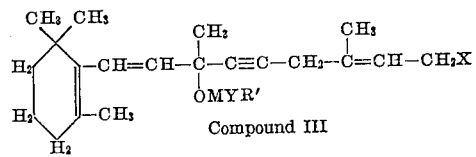

Compound III in which M, Y, R', and X have the same meaning as above and in which in the preferred form MY is MgBr, R' is nonexistent, and X is —OCH₃.

Hydrolysis of the reaction mixture containing Compound III in solution may be accomplished by any of the usual methods used for the hydrolysis of a Grignard reaction mixture, such as treating with dilute acids, water, or preferably with a solution of a water soluble ammonium salt which has been made slightly alkaline, pH 7.5–9.0, by the addition of aqueous ammonium hydroxide. Upon hydrolysis of Compound III, Compound I is produced.

After the hydrolysis is complete, it is necessary to remove unreacted reagent from the reaction mixture, and for this purpose, a base is employed. Inorganic bases such as alcoholic sodium hydroxide and potassium hydroxide or organic bases such as diethyl amine may be used.

The following equations illustrate the preferred process for the preparation of Compound I:

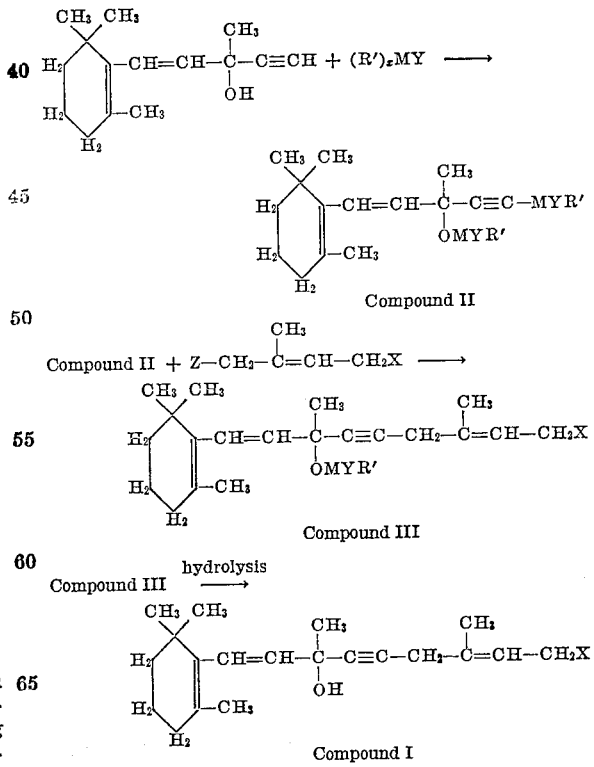

An alternate procedure for preparing Compound I is to react the beforementioned reagent

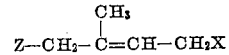

with sodium, potassium, lithium, or calcium acetylide and hydrolyze the reaction product to obtain a compound having the general formula

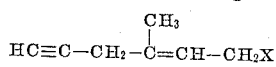

and then to react this with R″MgZ, where Z is a halogen and R″ is a hydrocarbon radical, to form an intermediary compound:

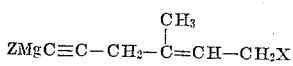

The above compound is reacted with β-ionone and upon hydrolysis of the reaction product, Compound I is obtained.

The following equations illustrate a specific example of the alternate process for the preparation of Compound I:

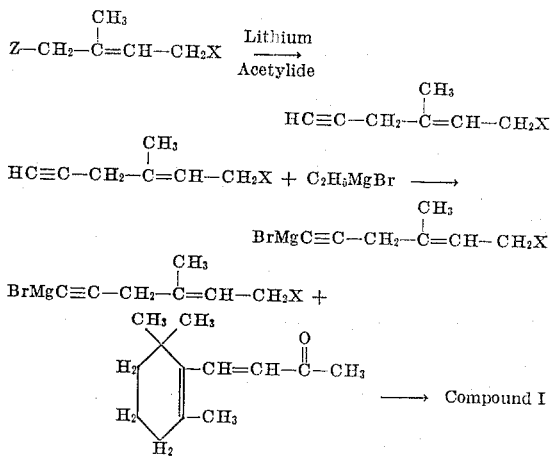

The acetylenic bond of Compound I may be reduced to a double bond; the resulting substance has the following structure:

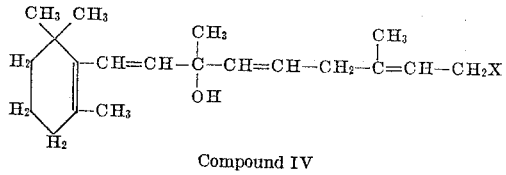

Compound IV where X has the same significance as before.

In the conversion of Compound I to Compound IV, catalytic hydrogenation may be used, and in this case it has been found that poisoned palladium supported on calcium carbonate, Raney nickel, or poisoned Raney nickel are satisfactory. Raney nickel may be satisfactorily poisoned by a cadmium salt, a zinc salt which forms a soluble complex in methyl alcohol with an amine, piperidine, pyridine, thiourea, aminothiazoles, or a combination of zinc acetate and piperidine; however, Raney nickel poisoned by a combination of zinc acetate and piperidine is the preferred catalyst. It is also possible to reduce by chemical reagents, but catalytic hydrogenation is preferred.

In the following specific examples for carrying out the reactions outlined above, the preparation of Compound I by the preferred route will be used as illustrative, and the compounds will be referred to by numbers used in the above description.

The folowing examples are given merely to illustrate specific ways in which the invention may be practiced, and it is to be understood that the invention is not to be restricted or limited thereby.

EXAMPLE I

Conversion of α-ethynyl-β-ionol into its Grignard derivative

One mole proportion (218 grams) of α-ethynyl-β-ionol was placed in a glass flask. Then there were added thereto about 600 grams of anhydrous ethyl ether which dissolved said α-ethynyl-β-ionol. This solution was continuously agitated or stirred while there were gradually added thereto two mole proportions of a Grignard reagent and in this illustration 267 grams of $C_2H_5MgBr$ dissolved in 700 cc. of anhydrous ethyl ether. After completion of this addition, the mixture was heated to boiling while continuously stirred and in a constant state of agitation and was maintained in this state of boiling under a reflux condenser for a period of approximately thirty minutes, whereby a novel reaction product which was dissolved in said ethyl ether was produced. It may be isolated therefrom in any convenient manner and has the following formula:

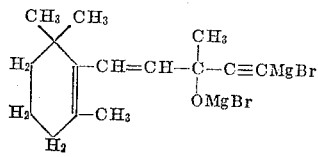

EXAMPLE II

Conversion of α-ethynyl-β-ionol into its lithium derivative

The same procedure as that set forth in Example I was followed except that two moles (44 grams) of methyl lithium were substituted for the ethyl magnesium bromide of Example I. The resultant reaction product had a low solubility factor in ethyl ether and separated out as a crystalline solid and has the following formula:

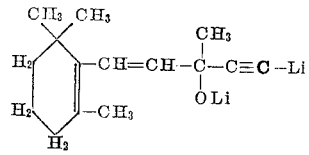

EXAMPLE III

Conversion of α-ethynyl-β-ionol into its Grignard derivative

The same procedure as that set forth in Example I was followed except that two moles (159 grams) of methyl magnesium chloride were substituted for the ethyl magnesium bromide of Example I. The resultant reaction product had a low solubility factor in ethyl ether and separated out as a crystalline solid and has the following formula:

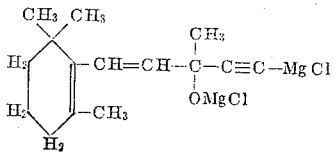

EXAMPLE IV

Conversion of α-ethynyl-β-ionol to its zinc iodide derivative

The same procedure as that set forth in Example I was followed except that two moles (415 grams) of methyl zinc iodide were substituted for the ethyl magnesium bromide of Example I. This novel reaction product was partially soluble in ethyl ether and may be isolated therefrom in any convenient manner and has the following formula:

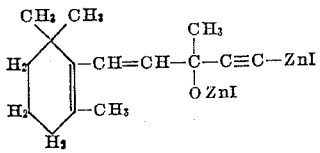

EXAMPLE V

*Condensation of α-ethynyl-β-ionol double Grignard with 1-chloro-2-methyl-4-methoxybutene-2 to form (Compound III—methoxy)*

To the reaction mixture from Example I containing Compound II in the preferred form and which had been allowed to cool to room temperature was added one mole proportion of the methyl ether of the 1,4 chlorohydrin of isoprene, followed by the addition of approximately 5 grams of anhydrous cupric chloride as a catalyst. The mixture was stirred under a reflux condenser and heated to boiling and kept at a boiling temperature under reflux four to eight hours, and then allowed to cool to room temperature and stirred for fifteen hours. At this point two layers were formed.

Cuprous bromide may be used to catalyze this condensation. When cupric chloride was used, a series of color changes from dark red to yellow occurred within the first few minutes, but when cuprous bromide was used, there were no color changes, but a gradual solution of the solid occurred. After approximately three-fourths of an hour, a heavy lower liquid layer was formed. Refluxing with stirring was continued at room temperature for fifteen hours in either case. By this time the lower liquid layer had changed to a tacky reddish mass.

EXAMPLE VI

*Hydrolysis of Compound III (methoxy) to obtain Compound I (methoxy)*

The reaction product from Example V was hydrolyzed by first chilling the stirred flask contents to —40° C. and adding slowly and cautiously 150 cc. of 30% aqueous ammonium chloride. The reaction mixture was allowed to come up slowly to room temperature with stirring and was then stirred until all solid matter had dissolved.

The hydrolysis may be made with aqueous acetic acid, and in this case, the reaction product from Example V was cooled to —10° C., and then an amount of a 5% aqueous solution of acetic acid equal to two to five times the mass of reaction product was slowly added with good stirring, while the whole was kept at —10° C. This temperature was maintained for an additional 15 minutes after addition of the acetic acid was completed. In either case the mass was allowed to come to room temperature and was filtered. The filtrate separated into two layers, an aqueous layer and an ether layer. The ether layer was separated from the aqueous layer and washed with water and then with sodium bicarbonate solution to neutralize any residual acetic acid.

A 5% aqueous solution of ammonium acetate may also be used to hydrolyze the reaction product from Example V by following the same conditions as when aqueous acetic acid is used.

The neutral reaction product obtained by the hydrolysis was treated to remove therefrom any unreacted methyl ether of the 1,4 chlorohydrin of isoprene. This was done by adding an organic base and in this example by adding diethyl amine, 73 grams (1 mole), to the wet etheral solution of the crude condensation product as directly obtained from the hydrolysis. The amine being higher boiling than ether, the ether was removed by distillation at atmospheric pressure. This solution was allowed to stand at room temperature for eight to twenty-four hours and was then poured into a large volume of water, whereupon liquid oily particles separated out and were extracted with ethyl ether which dissolved the same. This ether solution was separated and removed from the aqueous portion of the mix and was then washed with water several times, and finally with an aqueous solution of sodium carbonate. The solution was dried with anhydrous potassium carbonate or other suitable drying agent and filtered; the filtrate was recovered and concentrated under vacuum at room temperature. The concentrate consisted essentially of Compound I and was distilled under high vacuum at 105° C. to 115° C. and 0.001 mm. of mercury pressure. This material had a refractive index at 20° C. of 1.5116 and showed absorption in the ultra violet with a maximum at 2370 Å and a molecular coefficient of extinction at this wave length of 6,026. A formula such as that of Compound I has a theoretical value for carbon of 79.69% and of 10.19% for hydrogen; 79.63% carbon and 10.22% hydrogen were found on analysis.

It has been found that if the wet ether solution is concentrated without first adding a base, the moisture present eventually hydrolyzes some unreacted methyl ether of the 1,4 chlorohydrin of isoprene which is present in excess, and the free hydrogen chloride thus formed, even in traces, causes partial dehydration of the condensation product. By concentrating in the presence of an amine such hydrolysis may be prevented since any free hydrogen chloride formed is immediately neutralized by the amine present and thus prevents dehydration. On small experiments where the time required to remove the ether is relatively short, the presence of the amine is not necessary since the ether is fully removed before any of the chlorohydrin has a chance to hydrolyze and the product is treated at that point to remove the unreacted chlorohydrin as indicated below. However, on larger experiments, the time required to remove the ether is naturally much longer, and the chlorohydrin has a chance to hydrolyze. Under such conditions there must always be amine present or some other base to neutralize any hydrogen chloride that may be formed.

EXAMPLE VII

*Hydrogenation of Compound I (methoxy) by the use of poisoned palladium as a catalyst to produce Compound IV (methoxy)*

Compound I (methoxy) obtained by proceeding as in Example VI was dissolved in five to ten times its volume of anhydrous methanol containing .07 gram of zinc acetate and 10 cc. of diethyl amine per 150 cc. of the said solution of Compound I in methanol. To this solution was then added 10 grams of powdered activated charcoal "Norite" containing one gram of palladium metal uniformly distributed on its surface. This mixture was shaken to thoroughly distribute the components with respect to each other. The entire mixture was then shaken under an atmosphere of hydrogen gas at atmospheric pressure. A small amount of hydrogen was absorbed in this step. To this mixture were added 30 grams of calcium carbonate powder containing 0.36 gram of palladium hydroxide uniformly distributed on its surface, and this mixture was again subjected to shaking in an atmosphere of hydrogen at atmospheric pressure. Absorption of hydrogen was measured continuously as it was being added. When one mole of hydrogen had been absorbed, this operation was stopped and the mass was filtered; the filtrate was recovered and consisted essentially of a novel compound dissolved in methanol and having the following general formula:

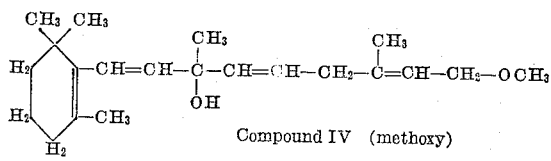

Compound IV (methoxy)

This methanol solution was poured into a large volume of water which dissolved the methanol and separated the oil therefrom. To this mass there was added ethyl ether which dissolved the oil. This mass separated into two layers, an ether layer and an aqueous layer. The ether layer was separated from the aqueous layer and washed several times with water; it was then dried with potassium carbonate or any other suitable drying agent, filtered, and the filtrate was recovered and concentrated under vacuum at room temperature. The concentrate was then subjected to high vacuum distillation. The product distilled at 105° C. to 115° C. at 0.001 mm. of mercury pressure. The fraction distilling at the above temperature range weighed 260 grams. This fraction has carbon and hydrogen values corresponding to the calculated values of a compound having the formula of Compound IV (methoxy). Calculated carbon=79.19%, found= 79.36%; calculated hydrogen=10.76%, found= 10.73%. This fraction is a golden yellow viscous liquid whose ultra-violet spectrum shows an absorption band with a maximum at 2360 Å and a molecular coefficient of extinction at this wave length of 6,500; it has an index of refraction at 20° C. of 1.5087. It shows the same growth-promoting properties in vitamin A deficient animals as does natural vitamin A.

EXAMPLE VIII

*Hydrogenation of Compound I (methoxy) by the use of poisoned Raney nickel as a catalyst to produce Compound IV (methoxy)*

The crude condensation product from Example VI was dissolved in five to ten times its volume of methanol and 2 cc. of pyridine and 6 grams of wet Raney nickel paste (Gilman Paint and Varnish Company) was then added. This mixture was shaken under hydrogen until the theoretical amount had been absorbed. After removal of the catalyst by filtration, the orange-red filtrate was poured into 5% brine solution and extracted with petroleum ether. The petroleum ether solution was washed once with 5% brine solution, dried over potassium carbonate, filtered, and the filtrate was concentrated at room temperature at 15–20 mm. of mercury pressure. The oily residue was distilled under high vacuum. When the temperature of the distilling liquid had reached 100° C./0.001 mm. of mercury pressure the remainder of the distillable material was collected and this was Compound IV (methoxy), a pale yellow, mobile liquid having a refractive index at 25° C. of 1.5070.

Another reduction of the crude condensation product of Compound I to Compound IV was made in the same way as above using 150 cc. of methyl alcohol as the solvent, 5 grams of Raney nickel as the catalyst and a combination of 5 cc. piperidine and 300 mg. of zinc acetate as the poison for the catalyst. This resulted in a product having the same physical properties as shown above; the yield was also approximately the same.

EXAMPLE IX

*Reaction of 1 - chloro - 2 - methyl - 4 - acetoxy-butene - 2 with the double Grignard of α-ethynyl-β-ionol to produce Compound I (acetoxy)*

To the double Grignard, prepared by adding 132 cc. of a 1.585 molar solution of ethyl magnesium bromide in dry ether to 21.8 grams of α-ethynyl-β-ionol in 50 cc. of dry ether, followed by a reflux period of one hour, were added two grams of cuprous bromide. The black color of the solution disappeared immediately, and the color was then light yellow. Eighteen grams of the acetoxy compound, in 20 cc. of ether, were added to the Grignard over a period of about ten minutes, and a second heavy layer appeared within a very short time after the addition was complete. The solution was stirred under nitrogen for eighteen hours and then cooled to −20° C. A saturated solution of ammonium chloride was carefully added, and the solution was then allowed to come up to room temperature. The solution was filtered, washed with water, then with ether and ammonium chloride aqueous solution alternately several times. The solution was again filtered, and the ether layer concentrated under vacuum. The residual oil was dissolved in 50 cc. of 95% ethyl alcohol and 50 cc. of diethyl ethanol amine. This solution was allowed to stand at room temperature for a period of two days under nitrogen and in the dark. The dark opaque reaction mixture was poured into several times its volume of brine solution and extracted with petroleum ether. The petroleum ether layer was washed with dilute acetic acid and then with water and finally with sodium bicarbonate solution. The solution was dried over potassium carbonate and concentrated under vacuum. The product of this reaction has the following formula:

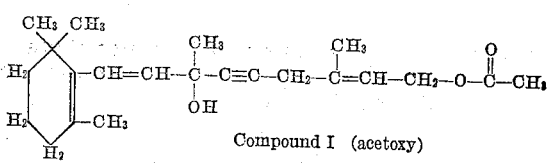

Compound I (acetoxy)

EXAMPLE X

*Reduction of Compound I (acetoxy)*

The concentrate obtained from Example X was dissolved in 150 cc. of t-butyl alcohol. One gram of catalytic material consisting of palladium on charcoal wherein 10% of the composition palladium, 2 cc. of water, and 10 cc of diethyl amine was added to the concentrate as a catalyst. The concentrate plus the catalyst mixture was shaken in the presence of hydrogen until an amount of hydrogen slightly in excess of the theoretical amount required to reduce an acetylenic bond to an ethylenic bond had been absorbed. The catalyst was then filtered off, and the resulting filtrate was poured into brine. This mixture was extracted several times with ether, washed well with water, and the ether solution was dried over potassium carbonate. The ether solution was filtered and concentrated under vacuum and finally distilled at $10^{-3}$ mm. Three fractions were taken.

The first fraction came over at 60° C. to 105° C. and had a refractive index at 27.7° C. of 1.5128. The second fraction came over at 105° C. to 110° C. and had a refractive index at 27.7° C. of 1.5278. The third fraction came over at 110° C. to 150° C. and had a refractive index at 27.7° C. of 1.5390. The third fraction represents the reduced product and is represented by the following formula:

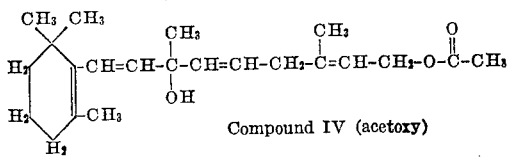

Compound IV (acetoxy)

This application is a continuation-in-part of my applications Serial No. 617,666, filed September 20, 1945; Serial No. 656,534, filed March 22, 1946, now abandoned; Serial No. 657,912, filed March 28, 1946; and Serial No. 657,913, filed March 28, 1946.

What is claimed is:

1. The method comprising hydrogenating a compound of the formula

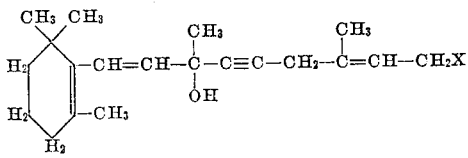

in which X is selected from the group consisting of —OR and

and R is a lower alkyl radical, to produce a compound of the formula

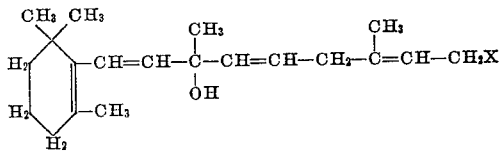

wherein X has the same significance as above.

2. The method comprising hydrogenating a compound of the formula

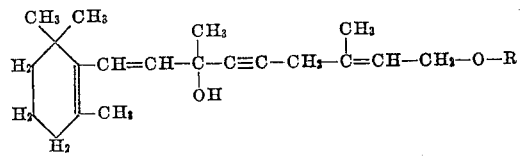

in which R is a lower alkyl radical, to produce a compound of the formula

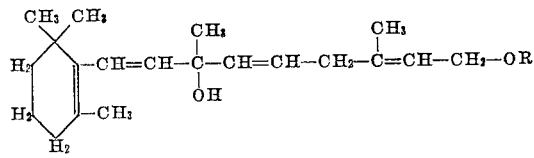

in which R is a lower alkyl radical.

3. The method comprising hydrogenating a compound of the formula

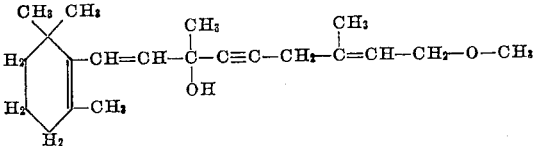

to produce a compound of the formula:

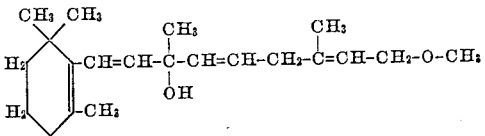

4. The method comprising reacting α-ethynyl-β-ionol with a metallo-organic compound of the class consisting of lithium, magnesium, and zinc alkyls and magnesium and zinc alkyl halides, in which each alkyl is of low molecular weight, to produce a compound in which the hydrogen of the hydroxyl group and the hydrogen of the acetylenic group are removed and the oxygen of the hydroxyl group and the terminal carbon of the acetylenic group are each bound to a metal.

5. A method according to claim 4 in which the metallo-organic compound is a magnesium alkyl halide.

6. A method according to claim 4 in which the metallo-organic compound is methyl lithium.

7. A method according to claim 4 in which the metallo-organic compound is ethyl magnesium bromide.

8. The method comprising reacting α-ethynyl-β-ionol with a metallo-organic compound of the class consisting of lithium, magnesium, and zinc alkyls and magnesium and zinc alkyl halides, in which each alkyl is of low molecular weight, to produce a compound in which the hydrogen of the hydroxyl group and the hydrogen of the acetylenic group are removed and the oxygen of the hydroxyl group and terminal carbon of the acetylenic group are each bound to a metal; and reacting the reaction product with a compound of the formula

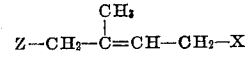

wherein Z is halogen, X is selected from the group consisting of —OR and

and R is a lower alkyl radical, to produce a compound of the formula

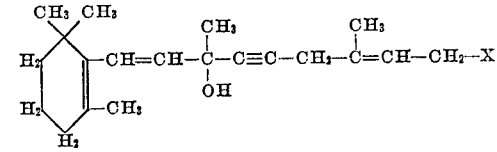

in which X has the same significance as above.

9. A method according to claim 8 in which Z is chlorine.

10. A method according to claim 8 in which X is —OR and R is a methyl radical.

11. The method comprising reacting α-ethynyl-β-ionol with a metallo-organic compound of the class consisting of lithium, magnesium, and zinc alkyls and magnesium and zinc alkyl halides, in which each alkyl is of low molecular weight, to produce a compound in which the hydrogen of the hydroxyl group and the hydrogen of the acetylenic group are removed and the oxygen of the hydroxyl group and the terminal carbon of the acetylenic group are each bound to a metal; reacting the reaction product with a compound of the formula

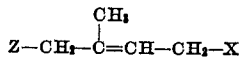

wherein Z is halogen, X is selected from the group consisting of —OR and

and R is a lower alkyl radical, to produce a compound of the formula

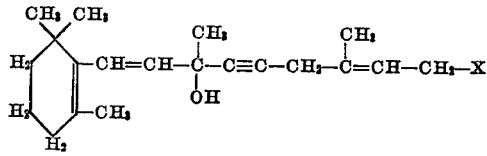

in which X has the same significance as above; and hydrogenating the acetylenic bond to produce a compound of the formula

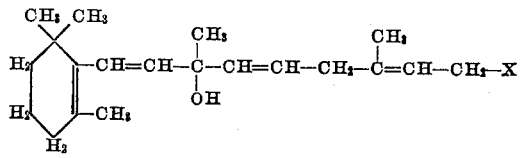

in which X has the same significance as above.

12. A method according to claim 11 in which the metallo-organic compond is a magnesium alkyl halide.

13. The method comprising reacting α-ethynyl-β-ionol with a metallo-organic compound of the class consisting of lithium, magnesium, and zinc alkyls and magnesium and zinc alkyl halides, in which each alkyl is of low molecular weight to produce a compound in which the hydrogen of the acetylenic group are removed and the oxygen of the hydroxyl group and the terminal carbon of the acetylenic group are each bound to a metal; reacting the reaction product with a compound of the formula

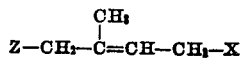

wherein Z is halogen, X is selected from the group consisting of —OR and

and R is a lower alkyl radical, to produce a compound of the formula

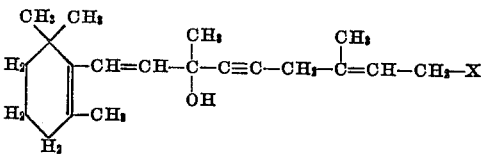

in which X has the same significance as above; hydrogenating the acetylenic bond to produce a compound of the formula

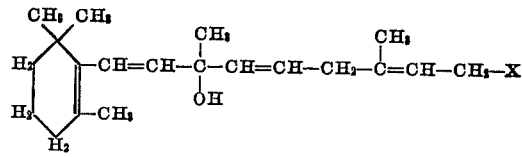

in which X has the same significance as above; and dehydrating to produce a conjugated pentaene having vitamin A activity.

14. A method according to claim 13 in which the metallo-organic compound is a magnesium alkyl halide.

15. A method according to claim 13 in which Z is chlorine.

References Cited in the file of this patent

UNITED STATES PATENTS

| Number | Name | Date |
|---|---|---|
| 2,369,157 | Milas | Feb. 13, 1945 |
| 2,369,159 | Milas | Feb. 13, 1945 |
| 2,382,086 | Milas | Aug. 14, 1945 |
| 2,412,465 | Milas | Dec. 10, 1946 |

OTHER REFERENCES

Kipping et al.: "Chemistry and Industry," August 26, 1939. Vol. 58, page 802.

Oroshink: "Jour. Am. Chem. Soc.," vol. 67 (1945), pages 1627, 1628.

Heilbron: "Jour. Chem. Soc." (London), 1948, page 387.